(12) United States Patent
Arkles et al.

(10) Patent No.: US 9,174,853 B2
(45) Date of Patent: Nov. 3, 2015

(54) METHOD FOR PRODUCING HIGH PURITY GERMANE BY A CONTINUOUS OR SEMI-CONTINUOUS PROCESS

(71) Applicant: Gelest Technologies, Inc., Morrisville, PA (US)

(72) Inventors: Barry C. Arkles, Pipersville, PA (US); George A. Timberlake, Jr., Gilbertsville, PA (US)

(73) Assignee: Gelest Technologies, Inc., Morrisville, PA (US)

( * ) Notice: Subject to any disclaimer, the term of this patent is extended or adjusted under 35 U.S.C. 154(b) by 0 days.

(21) Appl. No.: 14/540,466

(22) Filed: Nov. 13, 2014

(65) Prior Publication Data

US 2015/0158738 A1    Jun. 11, 2015

Related U.S. Application Data

(60) Provisional application No. 61/912,791, filed on Dec. 6, 2013.

(51) Int. Cl.
*H01L 21/44* (2006.01)
*C01G 17/00* (2006.01)
(Continued)

(52) U.S. Cl.
CPC ............ *C01G 17/003* (2013.01); *B01D 53/047* (2013.01); *B01D 53/0462* (2013.01); *C01B 3/56* (2013.01); *C01B 6/06* (2013.01); *C01G 17/00* (2013.01); *F25J 3/08* (2013.01); *B01D 2253/108* (2013.01); *B01D 2256/16* (2013.01); *B01D 2257/55* (2013.01)

(58) Field of Classification Search
CPC ............... B01D 53/46; B01D 2253/10; B01D 2257/00; B01D 2257/20; B01D 2257/204; B01D 2257/304; B01D 2257/406; B01D 53/52; B01D 53/8612; B01D 53/8671; B01D 2253/108; B01D 2256/16; B01D 2257/55
USPC .......................................................... 438/685
See application file for complete search history.

(56) References Cited

U.S. PATENT DOCUMENTS 4,668,502 A   5/1987   Russotti
7,087,102 B2  8/2006   Withers, Jr. et al.
(Continued)

FOREIGN PATENT DOCUMENTS

CN    101486444 A    7/2009
CN    102390808 A    3/2012
WO    2005005673 A2  1/2005

OTHER PUBLICATIONS

Martin et al., "Gas Separation by pressure swing adsorption" advances in cryogenic engineering, prenum press, NY 1986.*
(Continued)

*Primary Examiner* — Mark A Laurenzi
(74) *Attorney, Agent, or Firm* — Panitch Schwarze Belisario & Nadel LLP

(57) ABSTRACT

A continuous or semi-continuous process for producing a high purity germane includes (a) preparing a reaction mixture containing hydrogen and crude germane and (b) separating the hydrogen from the crude germane by a pressure swing adsorption process. The pressure swing adsorption process results in a hydrogen-rich product stream and a germane-rich product stream. The method further includes (c) purifying the germane-rich product stream by continuous distillation thereof to remove impurities therefrom and to produce a high purity germane containing less than 0.1 volume percent of impurities.

13 Claims, 3 Drawing Sheets

(51) Int. Cl.
- *B01D 53/04* (2006.01)
- *B01D 53/047* (2006.01)
- *F25J 3/08* (2006.01)
- *C01B 3/56* (2006.01)
- *C01B 6/06* (2006.01)

(56) References Cited

U.S. PATENT DOCUMENTS

2005/0191854 A1* 9/2005 Withers, Jr. ............. C22B 41/00
438/685
2008/0299037 A1 12/2008 Tezock

OTHER PUBLICATIONS

Jolly, "The Preparation of the Volatile Hydrides of Groups IV-A and V-A by Means of Aqueous Hydroborate", Journal of the American Chemical Society, vol. 83, pp. 335-337 (1961).

Knaebel, et al., "Pressure Swing Adsorption: Development of an Equilibrium Theory for Gas Separations", Chemical Engineering Science, vol. 40, pp. 2351-2360 (1985).

Sircar et al., "Purification of Hydrogen by Pressure Swing Adsorption", Separation Science and Technology, vol. 35, pp. 667-687 (2000).

Int'l Search Report and Written Opinion issued Mar. 6, 2015 in Int'l Application No. PCT/US2014/066640.

* cited by examiner

METHOD FOR PRODUCING HIGH PURITY GERMANE BY A CONTINUOUS OR SEMI-CONTINUOUS PROCESS

CROSS-REFERENCE TO RELATED APPLICATIONS

This application claims priority to U.S. Provisional Patent Application No. 61/912,791, filed on Dec. 6, 2013, entitled "Method for Producing High Purity Germane by a Continuous or Semi-Continuous Process," the entire contents of which are incorporated by reference herein.

BACKGROUND OF THE INVENTION

This invention involves a method for producing high purity germane by a continuous or semi-continuous process. The typical preferred commercial method for producing germane is an aqueous borohydride reduction of germanium dioxide, most often using sodium borohydride or potassium borohydride. Examples of this process may be found in U.S. Pat. No. 4,668,502 of Russotti; U.S. Pat. No. 7,087,102 of Withers et al.; and U.S. Patent Application Publication No. 2008/0299037 of Tezock.

Russotti, Withers et al. and Tezock are all directed to the yield and purification of germane from germanium dioxide. In particular, Withers et al. disclose a method for purifying a germane fluid, produced by a cryogenic-trapping technique. However, the co-product of the reduction, namely hydrogen gas, is not considered or discussed in detail in Russotti, Withers et al. or Tezock.

In general, in such reductions, impure germane leaves the primary process reactor entrained in a hydrogen gas stream at a volume concentration of approximately 2% to 20%. The presence of the co-product hydrogen gas presents enormous difficulties for high volume production of germane, particularly if the purification is completed in a batch-wise low temperature condensation of the germane out of the hydrogen stream. An article by W. Jolly published in the *Journal of the American Chemical Society* discusses the formation of hydrogen and removal of the germane from the hydrogen gas stream by cryogenic trapping (W. Jolly, *J Am. Chem. Soc.*, V. 83, p. 335 (1961)).

While methods for removal of the hydrogen gas, such as membrane separation and absorption, are alternatives which may potentially allow for continuous purification of the germane, such methods have not to date been reduced to practice. Accordingly, a method for producing high purity germane on a semi-continuous basis without the need for low temperature process conditions, such as those required for cryogenic trapping processes, would be desirable.

BRIEF SUMMARY OF THE INVENTION

One aspect of the present invention is directed to a method for producing high purity germane containing less than 0.1 volume percent of impurities. The method comprises: (a) preparing a reaction mixture containing hydrogen and crude germane; (b) separating the hydrogen from the crude germane by a pressure swing adsorption process, the pressure swing adsorption process resulting in a hydrogen-rich product stream and a germane-rich product stream; and (c) purifying the germane-rich product stream by continuous distillation thereof to remove impurities therefrom and to produce a high purity germane containing less than 0.1 volume percent of impurities.

BRIEF DESCRIPTION OF THE SEVERAL VIEWS OF THE DRAWINGS

The following detailed description of preferred embodiments of the present invention will be better understood when read in conjunction with the appended drawing. For the purposes of illustrating the invention, there is shown in the drawing an embodiment which is presently preferred. It is understood, however, that the invention is not limited to the precise arrangements and instrumentalities shown. In the drawings.

DETAILED DESCRIPTION OF THE INVENTION

According to the invention, a method is provided for generating and purifying germane ($GeH_4$) by a continuous or semi-continuous process.

Figure 1:
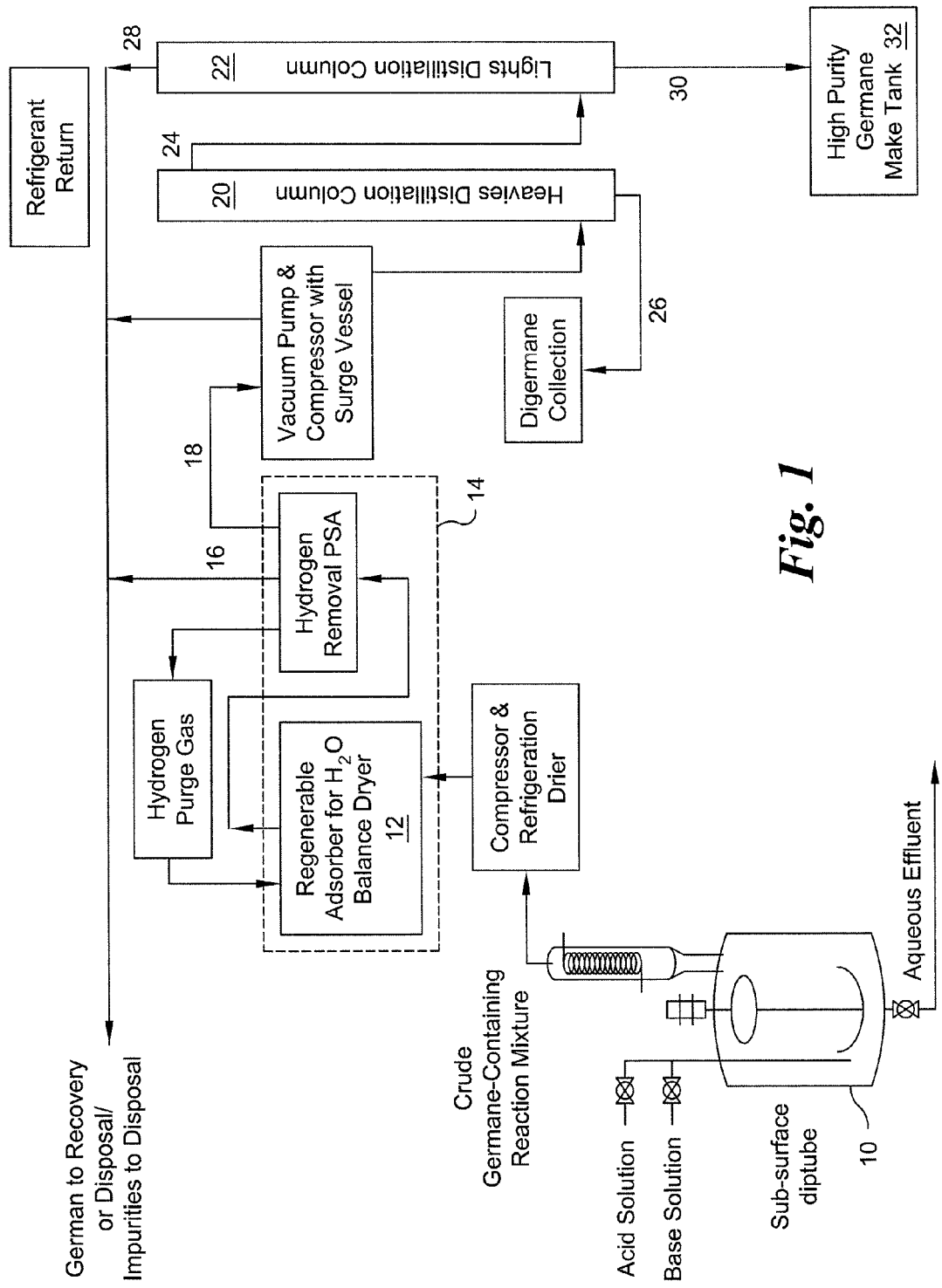
FIG. 1 is a schematic flow diagram of the process for producing high purity germane in accordance with an embodiment of the present invention.
Figure 2A:
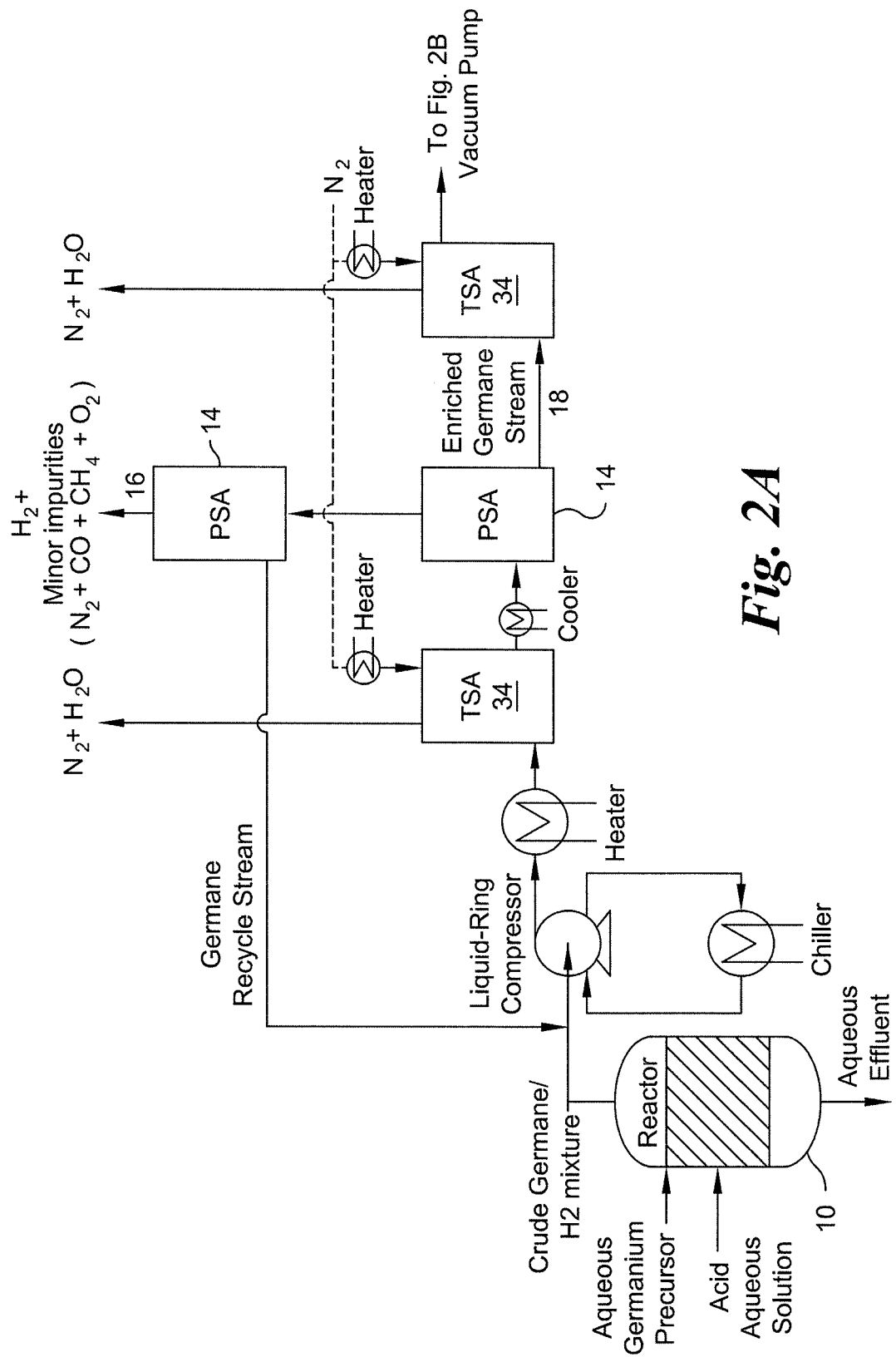
FIG. 2A is a schematic flow diagram of the generation and purification steps of a process for producing high purity germane in accordance with an embodiment of the present invention, prior to the distillation steps.
Figure 2B:
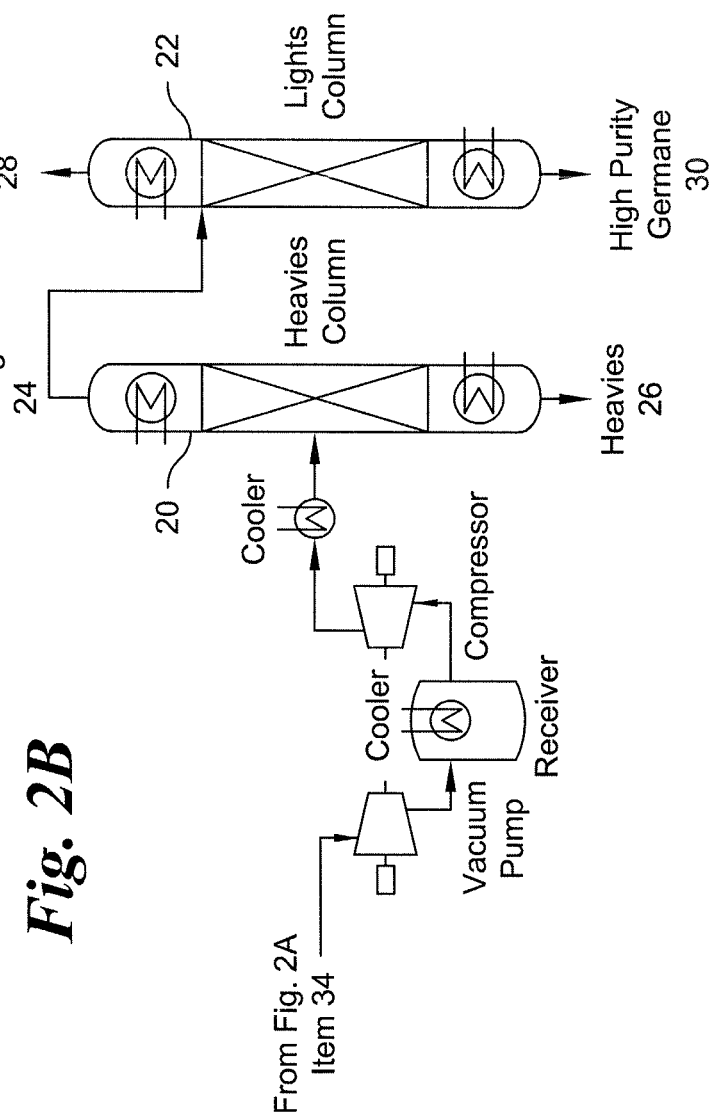
FIG. 2B is a schematic flow diagram of the distillation steps of a process for producing high purity germane in accordance with an embodiment of the present invention.

Referring to FIGS. 1-2B, the method comprises producing a germane-containing reaction mixture by reacting one or more germanium-containing compounds such as, for example, germanium oxide (also known as germanium dioxide), alkali metal germanates (such as potassium germanate), and/or compounds formed in situ from germanium tetrachloride, germanium or various germanides, with one or more hydrogen-containing reducing agents in a reactor 10 to provide a reaction mixture. Preferably, the hydrogen-containing reducing agent is a borohydride. Examples of reducing agents that may be used include sodium borohydride, potassium borohydride, lithium borohydride. The various components may be mixed together in ratios known in conventional reaction methods. Also, the various components may be added directly to the reactor 10 with good turbulent mixing or, alternatively, may be fed through a static mixer (not shown) before entering the reactor 10.

The reaction is preferably conducted in an aqueous medium under conventional temperature and pressure conditions. However, it will be understood that the reaction may instead be conducted in a non-aqueous medium, such as an organic solvent, or utilizing a combination of aqueous and non-aqueous media. Preferably, the method comprises producing a germane-containing reaction mixture by borohydride reduction of germanium oxide or its hydrate germanium hydroxide in an aqueous solution. However, it will be understood by those skilled in the art that any known processes for producing germane-containing mixtures may be utilized.

The reaction mixture primarily contains germane ($GeH_4$) and hydrogen ($H_2$), as well as carbon dioxide ($CO_2$), water vapor ($H_2O$), digeonane ($Ge_2H_6$) and possibly other trace gases and impurities. More particularly, in one embodiment, the reaction mixture contains 80% or greater, and more preferably 80% to 98% by volume hydrogen gas with the balance being germane, carbon dioxide, water vapor, digermane and other trace gases and impurities.

According to the present invention, the hydrogen is considered an impurity and it is thus preferable to separate the hydrogen from the germane in the reaction mixture. Accordingly, referring to FIGS. 1-2B, after the reaction mixture has been produced, the reaction mixture is subsequently subjected to a separation process to separate the hydrogen from the germane. In a preferred embodiment, separation of the hydrogen from the germane is effected using pressure swing adsorption (PSA) technology. The use of PSA technology to purify hydrogen and separate it from impurities is described in a *Separation Science and Technology* article by S. Sircar et al., as well as in a *Chemical Engineering Science* article by K. Knaebel (S. Sircar et al, *Separation Science and Technology*, V. 35, p. 667 (2000); K. Knaebel, *Chemical Eng. Sci.*, V. 40, p. 2351 (1985), respectively)

In general, PSA technology is based on a physical binding of gas molecules to an adsorbent material. Adsorptive materials, such as zeolites, are used as a molecular sieve, to adsorb a target gas species at a high pressure. The process then swings to a low pressure to desorb the adsorbed target gas species from the adsorbent material. The respective forces acting between the target gas molecules and the adsorbent material depend on various factors, such as the gas component, the type of adsorbent material used, the partial pressure of the gas component, and the operating temperature.

PSA technology can be used to separate gases in a mixture because each of the gas components has different binding forces with respect to different adsorbent materials. For example, a highly volatile component with low polarity, is only weakly adsorbed under specific process conditions and using specific adsorbent materials. On the other hand, under these same process conditions and using the same adsorbent materials, gas molecules such as $N_2$, CO, $CO_2$, hydrocarbons, water vapor and germane are generally strongly adsorbed. Preferably, the reaction mixture, including hydrogen, germane species, $CO_2$, water vapor and impurities, is passed through an adsorbent material 12, preferably in the form of an adsorption bed, in a PSA vessel 14. The adsorbed hydrogen may then be readily desorbed and recovered by slightly reducing the pressure, such that an enriched hydrogen stream is released from the PSA vessel.

Germane and the other components of the reaction mixture are also adsorbed by the adsorption bed 12. The adsorbed germane and other components can then be desorbed and recovered separately by a further reduction in the pressure of the PSA vessel and subsequently purified by a distillation process. Preferably, however, the reduction of pressure is performed in a single-stage to effect desorption of the germane, digermane, $CO_2$, water vapor and trace gases, and the small amount of adsorbed hydrogen is removed during the subsequent distillation process, as described in more detail herein.

Specifically, the gaseous reaction mixture of germane, hydrogen, $CO_2$, water vapor, digermane, and trace gases is introduced into a PSA vessel 14 as an input process stream. The PSA vessel contains one or more adsorbent materials that attract germane species more strongly than hydrogen. The adsorbent material(s) may be any commercially available adsorbent material, such as carbon, colloidal, precipitated or aerogel silicas, activated aluminas, molecular sieves and zeolite molecular sieves. Preferably, the adsorbent material(s) is/are one or more zeolite molecular sieves. Examples of zeolites that may be used are 3A, 4A, 5A, 10X, 13X, Y, ZSM-5 and synthetic mordenite. Preferably, the zeolite is 5A or 13x. The pressure swing adsorption bed of the PSA vessel may be of any dimensions as necessary to carry out the adsorption/desorption activities. Preferably, however, the packed bed volume of the adsorption bed has an aspect ratio (L/D) of at least 5:1, and more preferably greater than 12:1.

During the adsorption stage, the PSA vessel 14 is at a relatively high pressure of approximately 15 to 600 psia to effect adsorption of the germane species, $CO_2$, water vapor and trace gases. More preferably, the PSA vessel operates under a pressure of approximately 30 to 250 psia, and most preferably approximately 50 to 75 psia, during the adsorption stage. Preferably, a significant portion of the germane species (i.e., germane and digeimane) contained in the input process stream (i.e., the reaction mixture) are adsorbed by the zeolite molecular sieve and only a small portion of the hydrogen contained in the input process stream (preferably 5% or less by volume) is adsorbed by the zeolite molecular sieve. The bulk of the hydrogen gas simply passes through the zeolite molecular sieve without being adsorbed thereby.

As such, a first gas stream 16 exiting the vessel 14 after the adsorption stage is enriched in hydrogen and contains very low levels of germane (i.e., a hydrogen-rich product stream). More preferably, approximately 90% or greater, and most preferably 96 to 99% by volume of the germane species contained in the input process stream (i.e., the reaction mixture) are adsorbed by the zeolite molecular sieve, such that the exiting hydrogen-rich product stream contains approximately 1% or less by volume of germane species, and more preferably approximately 0.1 to 0.4% by volume of germane species.

When the adsorbent zeolite molecular sieve reaches its adsorption capacity, the pressure in the PSA vessel is reduced to approximately 0 to 50 psia, and more preferably to approximately 15 to 50 psia, to effect desorption of the adsorbed germane species, $CO_2$, water vapor and trace gases from the zeolite molecular sieve. As a result of the lower pressure in the PSA vessel, the adsorbed germane species, $CO_2$, water vapor and trace gases are released or desorbed from the zeolite molecular sieve as a second gas stream, such that the zeolite molecular sieve is regenerated for another PSA separation process cycle. The second gas stream 18 is a germane species-containing output product stream that is substantially free of hydrogen, and more preferably includes only approximately 5% or less by volume of hydrogen. The germane species-containing output product stream also includes the adsorbed and desorbed $CO_2$, water vapor and trace gases.

Thus, the PSA vessel 14 and process utilize alternating pressures and partial pressures to perform adsorption and desorption of germane, its co-products and contaminant by-products by and from the zeolite molecular sieve. Further, the PSA process is carried out at a generally constant temperature of approximately −5 to 40° C., and more preferably approximately 5 to 30° C., and most preferably approximately 20° C. As such, no heating or cooling (i.e., cycling of the temperature) of the PSA vessel is required, and relatively short PSA separation process cycles, generally within the range of minutes, can be achieved for separation of the germane and hydrogen.

It will be understood that the cycle times for adsorption and desorption of germane are temperature dependent, with temperatures above 50° C. generally being avoided to decrease the formation of other impurities. Typically, however, the cycle time for germane desorption is between twenty minutes and six hours, preferably between twenty five minutes and five hours, and more preferably between thirty minutes and four hours. Preferably, the cycle time for germane adsorption generally matches that of germane desorption. However, it will be understood that the cycle times, temperature, pressure and other parameters of the adsorption and desorption cycles may be adjusted as necessary to obtain a germane stream of the desired purity.

Referring to FIGS. 1-2B, after the hydrogen-rich output product stream 16 exits the PSA vessel 14, it is either vented with flash-back prevention or utilized as a process stream for another application. Referring to FIGS. 1-2B, the germane species-containing output product stream 18 is delivered, preferably continuously, from the PSA vessel to dual distillation columns 20, 22. The distillation columns 20, 22 and a heavies distillation column and a lights distillation column, respectively. The distillation columns 20, 22 may be constructed of any appropriate materials, such as, for example, stainless steel, monel, hastelloy and glass-lined steel. Preferably, in order to obtain the highest purity germane, the materials of construction of the distillation columns 20, 22 are generally passivated by exposure to germane, which reduces the potential for the formation of digermane and other higher polygermane species during the distillation process.

The dual distillation columns 20, 22 are arranged as a high pressure rectification system, with a condensate return temperature of no less than −40° C. (i.e., −40° C. or above). It will be understood that more than two distillation columns may be utilized as necessary to effect purification of the germane species-containing output product stream. Each of the distillation columns 20, 22 preferably operates at a pressure of no greater than 500 psi, and more preferably at a pressure of approximately 200 to 400 psi, and most preferably at a pressure of approximately 300 psi.

Referring to FIGS. 1-2B, in a preferred embodiment, upon removal from the PSA vessel 14, the germane species-containing output product stream 18 is passed through the first or upstream heavies distillation column 20, preferably primarily for removal of the digermane. The top temperature of the upstream distillation column 20 is maintained at approximately −5° C. to −15° C., and more preferably approximately −10° C. In the upstream distillation column 20, a digermane stream 26 is removed from the bottom of the column 20 and a partially purified germane stream 24 is removed from the top of the column 20 at a discharge temperature of approximately −10° C. The partially purified germane stream output 24 from the upstream distillation column 20 is preferably 96% or greater pure by volume. In one embodiment, at least a portion of the $CO_2$, water vapor and/or trace gases are removed with the digermane stream 26 from the bottom of the upstream distillation column 20.

Referring to FIGS. 1-2B, the partially purified germane stream 24 of the upstream distillation column 20 is then introduced into and passes through the second or downstream lights distillation column 22 for further purification of the product stream 24 to remove any impurities which are present. The bottom temperature of the downstream distillation column 22 is maintained at approximately 15° C. to 25° C., and more preferably approximately 20° C. In the downstream distillation column 22, any remaining impurities, including any remaining hydrogen and traces of oxygen, nitrogen, argon and other non-condensible components, are removed as a lights stream 28 from the top of the column 22 and a stream 30 highly purified germane is removed from the bottom of the column 22 at a discharge temperature of approximately 20° C., thus completing purification of the germane.

More particularly, the high purity germane 30 produced after the above-described PSA and purification (i.e., distillation) processes is preferably 98% or greater pure by volume (i.e., contains 2% or less impurities), and more preferably 99% or greater (i.e., contains 1% or less impurities), and most preferably 99.9% or greater (i.e., contains 0.1% or less impurities). The high purity germane is then transferred to a holding or storage tank 32, from where it can be distributed for use in various applications, such as cylinder-fill or blending operations.

It will be understood by those skilled in the art that the purification stage of the present invention need not include two distillation columns. Instead, depending on the specifications of the end-use applications, only one distillation column may be utilized to remove the digermane and other impurities from the germane species-containing output product stream of the PSA vessel and process.

Referring to FIGS. 2A-2B, in one embodiment, a temperature swing adsorption (TSA) unit 34 is utilized to remove entrained or trace water, $CO_2$ and other polar species prior and/or subsequent to the PSA vessel or unit 14.

In another embodiment, a packed metal hydride column (not shown), and more preferably a packed lithium hydride column, may be utilized to remove any oxide species formed during the process by the interaction of germane with non-passivated process equipment.

The invention will now be described further in connection with the following, non-limiting example.

EXAMPLE 1

A reaction mixture was prepared by borohydride reduction of germanium oxide. The reaction mixture contained 6% by volume germane and trace amounts of carbon dioxide, water vapor, digermane and other impurities, with the remainder of the reaction mixture being hydrogen. The reaction mixture was then introduced into a PSA vessel including a pressure swing adsorption bed operating with 5A zeolite molecular sieve (i.e., alkali metal alumino silicate). The PSA vessel was initially at a pressure of approximately 200 to 220 psi to effect adsorption of the germane species contained in the reaction mixture. After a predetermined period of time, the pressure of the PSA vessel was reduced to approximately 15 to 50 psi to effect desorption of the adsorbed germane species. The adsorption and desorption stages were preferably carried out for approximately four hours each. During both the adsorption and desorption stages, the temperature of the PSA vessel was maintained at approximately 20° C. The hydrogen-rich output product stream contained approximately 1 to 4% by volume of germane species and the germane species-containing output product stream contained approximately 5% by volume of hydrogen.

Next, the germane species-containing output product stream was fed to a first distillation column operating at a pressure of approximately 200 psi to effect removal of the digermane and any other germane-containing impurities. The discharge stream from the top of the first distillation column, maintained at a temperature of approximately −10° C., was thus a partially purified discharge stream having a purity greater than 99% by volume. The top partially purified discharge stream was then fed to a second distillation column for further purification, and more particularly for removal of any remaining impurities and traces of oxygen, nitrogen, argon and other non-condensible components. A highly purified germane stream was discharged from the bottom of the second distillation column at a temperature of approximately 20° C. and a purity of approximately 99.99% or greater by volume.

Tests of adsorption isotherms revealed that adsorption of the germane and digermane was effected by physisorption, also known as physical adsorption or physically-driven adsorption, rather than chemisorption, also known as chemical adsorption or chemically-driven adsorption. Specifically, it was found that adsorption and desorption (i.e., uptake and release) of the germane and digermane by the PSA vessel was repeatable and consistent and the result of physical forces instead of chemical reactions. This was surprising, since, based on the reactivity of germane and digermane, it was believed that chemisorption would occur as a result of decomposition of the components. Chemisorption would have resulted in germanium being adsorbed and hydrogen being released, and thus premature exhaustion of the adsorbent material due to filling with germanium metal and waste of the germane component. However, it was surprisingly found that the method of the present invention resulted in physisorption of the germane and digermane with little to no degradation of germane to germanium metal.

Thus, the present invention provides for easy separation of hydrogen from a reaction mixture containing crude germane, production of a high purity germane product (i.e., 98% or greater purity), recovery of 90% or greater of the germane contained in the reaction mixture, little to no degradation of germane to germanium metal, and a hydrogen-rich byproduct stream containing low levels of germane. The PSA process, in particular, allows for the semi-continuous and economical generation of high purity germane. Also, the life span and efficiency of the PSA vessel may be improved by separately removing water from the reaction mixture prior to treating the reaction mixture in the PSA vessel.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A continuous or semi-continuous process for producing a high purity germane containing less than 0.1 volume percent of impurities, the method comprising:
   (a) preparing a reaction mixture containing hydrogen and crude germane;
   (b) separating the hydrogen from the crude germane by a pressure swing adsorption process, the pressure swing adsorption process resulting in a hydrogen-rich product stream and a germane-rich product stream; and
   (c) purifying the germane-rich product stream by continuous distillation thereof to remove impurities therefrom and to produce a high purity germane containing less than 0.1 volume percent of impurities.

2. The method of claim 1, wherein the reaction mixture is prepared by contacting a germanium-containing compound with a hydrogen-containing reducing agent.

3. The method of claim 2, wherein the reducing agent is a borohydride.

4. The method of claim 3, wherein the germanium-containing compound is germanium dioxide.

5. The method of claim 1, wherein the pressure swing adsorption process takes place in a vessel including an adsorbent material having a form of a zeolite molecular sieve.

6. The method of claim 5, wherein the zeolite molecular sieve is a 5A zeolite molecular sieve.

7. The method of claim 5, wherein during the pressure swing adsorption process, germane is adsorbed by and desorbed from the zeolite molecular sieve in respective adsorption and desorption stages.

8. The method of claim 7, wherein the reaction mixture further contains digermane and the digermane is adsorbed by and desorbed from the zeolite molecular sieve in the respective adsorption and desorption stages together with the germane.

9. The method of claim 7, wherein the pressure of the vessel is maintained at approximately 30 to 250 psia during the adsorption stage and the pressure of the vessel is maintained at approximately 0 to 50 psia during the desorption stage.

10. The method of claim 9, wherein the temperature of the vessel is generally constant.

11. The method of claim 1, wherein the continuous distillation of the germane-rich product stream includes passing the germane-rich product stream through a first distillation column to produce a partially purified germane product.

12. The method of claim 11, wherein the continuous distillation of the germane-rich product stream includes passing the partially purified germane product through a second distillation column to produce the high purity germane.

13. The method of claim 11, further comprising passing the reaction mixture through a thermal swing adsorption unit prior or subsequent to the pressure swing adsorption process.

* * * * *